United States Patent [19]

Moyle et al.

[11] 3,928,575

[45] Dec. 23, 1975

[54] METHOD AND COMPOSITION FOR RAPID DISINFECTION

[75] Inventors: Clarence L. Moyle, Clare; Paul A. Wolf, Midland, both of Mich.

[73] Assignee: The Dow Chemical Company, Midland, Mich.

[22] Filed: Jan. 30, 1974

[21] Appl. No.: 438,074

Related U.S. Application Data

[63] Continuation of Ser. No. 118,520, Feb. 24, 1971, abandoned.

[52] U.S. Cl. .................. 424/153; 424/304; 71/65; 71/67; 71/83
[51] Int. Cl.² .................. A61K 33/14; A01N 9/02
[58] Field of Search ................ 71/67; 424/304, 153

[56] References Cited
UNITED STATES PATENTS

| | | | |
|---|---|---|---|
| 1,429,276 | 9/1922 | Davis | 424/150 |
| 2,419,888 | 4/1947 | Nolan et al. | 424/304 |
| 3,136,716 | 6/1964 | Kitter | 71/67 |
| 3,493,658 | 2/1970 | Schmidt et al. | 424/304 |
| 3,647,610 | 3/1972 | Wolf | 162/161 |
| 3,716,351 | 2/1973 | Kunkel | 71/67 |

*Primary Examiner*—Glennon H. Hollrah
*Attorney, Agent, or Firm*—Theodore Post; C. Kenneth Bjork

[57] ABSTRACT

Rapid destruction of microorganisms is obtained by contacting microorganisms in the presence of water with a halocyanoacetamide such as 2,2-dibromo-2-cyanoacetamide and at least 0.5 mole of a water soluble bromide or iodide salt such as sodium iodide per mole of halocyanoacetamide.

12 Claims, No Drawings

METHOD AND COMPOSITION FOR RAPID DISINFECTION

This is a continuation of application Ser. No. 118,520 filed Feb. 27, 1971, now abandoned.

SUMMARY OF THE INVENTION

The present invention is concerned with a composition and method useful in the control of microorganisms such as bacteria, fungi and algae. More particularly the invention is directed to a method which comprises contacting microorganisms, in the presence of water with an antimicrobial amount of a mixture of a halocyanoacetamide corresponding to the formula

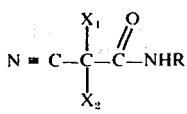

wherein $X_1$ represents chlorine or bromine; $X_2$ represents chlorine, bromine or hydrogen and R represents hydrogen or methyl, and a water-soluble halide, selected from bromide and iodide. The invention also includes compositions useful in the practice of the method, and comprising a halocyanoacetamide compound corresponding to the above formula and a source of halide ion, preferably a water-soluble halide salt such as an alkali metal, alkaline earth metal or ammonium bromide or iodide.

The halocyanoacetamide compounds employed in the method and composition of the invention have significant antimicrobial and disinfectant activity as disclosed, for example, in U.S. Pat. Nos. 3,493,658 and 2,419,888; French Pat. No. 1,450,854 and Canadian Pat. No. 837,471. They vary considerably in antimicrobial potency from 2,2-dibromo-2-cyanoacetamide, which is a highly potent, rapid antimicrobial agent in aqueous systems at concentrations as low as 0.5 parts per million, to the compounds of the above formula wherein $X_1$ is chlorine and $X_2$ is hydrogen or chlorine, which have such low rates of disinfectant action as to be of little or no practical value as disinfectants, even at relatively high concentrations. Preferred halocyanoacetamide compounds include those corresponding to the above formula wherein $X_1$ is bromine, and those wherein $X_1$ is bromine and R is hydrogen. The halocyanoacetamide compound of choice is 2,2-dibromo-2-cyanoacetamide.

The water-soluble halide salts employed in the method and composition include the alkali metal, alkaline earth metal, and ammonium bromides and iodides, for example, sodium, potassium, calcium, magnesium and ammonium bromides and iodides. In a limited sense, such salts may be said to have disinfectant activity, primarily when employed in extremely concentrated solutions, such as 10 percent and higher, in which osmotic pressure is a significant factor. At concentratiotn levels normally useful for disinfection, the halide salts exert little or no significant antimicrobial action and in many cases may contributor ions necessary for microbial nutrition. In the present invention the water-soluble halide salts are employed as a source of halide ions, which, while having little or no detectable anti-microbial or disinfectant activity themselves under the conditions of use, greatly enhance the disinfectant action of the halocyanoacetamide compound employed therewith.

It has now been found that the combination of such halocyanoacetamide compounds with aqueous bromide or iodide ions provides greatly enhanced disinfectant action for the combination in comparison to the individual ingredients thereof. The enhanced results provide accelerated microbial destruction. For example, a combination of 10 parts by weight of 2,2-dibromo-2-cyanoacetamide and 90 parts by weight of sodium iodide can exhibit microbial killing rates more than tenfold greater in logs per minute than can be obtained with either ingredient alone. The results provided by the combination also provide greatly increased net antimicrobial effects over a given time period. For example, combinations of 2,2-dichloro-2-cyanoacetamide and sodium iodide can provide sterilizing action with 1 hour of exposure to microorganisms, while microbial counts obtained with the two components alone are in the 8 to 9 log range (one hundred million to one billion organisms per milliliter).

Thus the composition and method of the invention can be employed by conventional means in the control of microorganisms. They are particularly useful when employed in the presence of water, in aqueous preparations susceptible to microbial attack, either in the disinfection and preservation of aqueous solutions and suspensions such as cutting oil emulsions, drilling oil emulsions, industrial wash waters, industrial cooling waters, swimming pools, paper pulp slurries and the like which are subject to attack by bacteria, fungi and/or algae; or in the disinfection of solid surfaces subject to microbial contamination such as walls, floors, pipes, drains, implements, machinery, containers, and the like, by application of aqueous disinfectant compositions containing antimicrobial amounts of the active combination.

Under ordinary conditions, the destruction of microorganisms by a disinfectant composition requires contact of the organisms with the disinfectant composition for a period of time during which the organisms are destroyed. The rate of disinfectant action depends on a variety of factors such as the nature of the substrate, concentration of the disinfectant composition, concentration and type of organisms, temperature, age of the microbial population, and the like. The antimicrobial effect obtained within a given exposure time under a particular set of conditions can also depend upon such factors as the rate of reproduction of surviving microorganisms relative to the rate at which the disinfectant is removed from the system, rate at which new microbial populations are introduced, and the relation between the rate of disinfectant action and concentration of the disinfectant. In the case of most disinfectant materials, the rate of antimicrobial action and the effect obtained in a given time period can be increased by employing very high antimicrobial concentrations of the active antimicrobial agent.

It is a feature of the method and composition of the present invention that the rate of action of the halocyanoacetamide disinfectant ingredient is markedly increased by the presence of the bromide or iodide ingredient, without any increase in the concentration of the halocyanoacetamide ingredient. The results obtained by the practice of the invention can be characterized as synergism, since the net antimicrobial effect produced employing both ingredients is greater than the additive result which could be expected from the activity of either ingredient alone. Since the method and composition of the invention provide excellent antimicrobial results when the halide ingredient is employed at concentrations well below the levels at which such salts have a significant antimicrobial effect, the results obtained with the invention can also be characterized as potentiation, rather then synergism. Also, since the invention provides increased rates of disinfectant activity, the results obtained by the practice of the invention can also be characterized as accelerated antimicrobial activity.

In the practice of the method of the invention, an antimicrobial amount of a mixture of one or more haloactamide compound and one or more halide salt compound is contacted with the microorganisms, their habitat or their substrate in any convenient order or fashion, the contacting and exposure being carried out in the presence of water. The exact antimicrobial amount to be employed can vary depending upon such factors as the organisms to be controlled, the exact compounds employed, the relative proportions of halide and halocyanoacetamide in the mixture, and the antimicrobial effect desired within a desired contact time. In general, good antimicrobial results can be obtained with concentrations of from about 0.5 to 10,000 or more parts by weight of the mixture, per million parts by weight of ultimate aqueous composition. In one mode of carrying out the method, the halocyanoacetamide compound and a water-soluble halide salt are added to an aqueous preparation which is susceptible to microbial attack or contaminated with microorganisms to provide an antimicrobial amount of the mixture in the ultimate aqueous preparation. In another mode, the ingredients are mixed together with water to provide an antimicrobial amount of the mixture therein, and the resulting aqueous mixture is applied to the microorganisms, their habitats or substrates.

The proportions of the halocyanoacetamide and halide salt ingredient to be employed can vary considerably, provided that at least 0.05 mole of halide ion is provided per mole of halocyanoacetamide and excellent results can be obtained with mixtures containing from about 3 to almost 100 percent by weight of water-soluble halide salt ingredient. In general, at least about 3 parts by weight of halide salt should be employed for 97 parts by weight of halocyanoacetamide compound. The maximum amount of halide ion to be employed in conjunction with the halocyanoacetamide is not critical for obtaining highly accelerated rates of activity or increased antimicrobial effect. The maximum amounts of the halide salt to be employed thus depend on factors such as economy and the absolute amount of salt desired to be present after disinfection is completed. In general, the amount of the salt employed in the mixture is such that an antimicrobial amount of the ultimate aqueous composition contains less of the salt ingredient than is required to achieve inhibition and killing of microorganisms by osmotic pressure under the same conditions, and the salt is preferably employed in amounts in which the salt has no antimicrobial effect under the same conditions. In a convenient procedure, the halide salt is employed in an amount of from about 3 to about 99.999 percent by weight of the ultimate mixture, and best disinfectant results are generally obtained with mixtures of the halide salt and halocyanoacetamide when the halide salt is employed in amounts of from about 20 to about 95 percent by weight. The extent of acceleration of disinfectant effect is generally greater as the halide concentration is increased, and mixtures with water-soluble halide salt contents of 40 to 99 percent, 50 to 95 percent, 60 to 95 percent or 80 to 95 percent, for example, have excellent accelerated antimicrobial activity.

In a convenient procedure, an aqueous preparation subject to microbial attack is treated by the addition thereto of an antimicrobial amount of one or more halocyanoacetamide compounds corresponding to the above formula and the addition thereto to one or more halide salt in an amount sufficient to provide the halide salt in a proportion of from about 40 to about 95 percent by weight of the combination of halide salt and halocyanoacetamide. The two components can be added in any convenient order or fashion. The minimal antimicrobial amount of the combination employed in this procedure will be somewhat greater than the minimal antimicrobial amount of the combination required, since the amount employed is based on an antimicrobial amount of the halocyanoacetamide alone. However, greatly accelerated antimicrobial action is obtained by this procedure, and much greater net antimicrobial results are obtained within limited duration of contact between the microorganisms to be controlled and the ultimate aqueous composition. This embodiment of the method of the invention can be employed, for example, to obtain microbicidal results while using an antimicrobial amount of halocyanoacetamide sufficient to inhibit microbial growth but insufficient to provide substantial microbicidal results.

The mixtures of the invention can be formulated as disinfectant compositions by the addition of suitable liquid carriers such as water, alcohols, liquid hydrocarbons or the like; or finely divided solid carriers such as talc, bentonite or attapulgite clay. An excess of the halide salt beyond the amount required to achieve a desired potentiated antimicrobial effect is not detrimental, and can serve as a carrier in addition to any further acceleration of activity provided thereby. Such compositions can be prepared as treating compositions for direct application, or as concentrates to be diluted or dispersed in a liquid carrier such as water either prior to or during use. In general, the solid compositions have greater storage stability than liquid solutions or suspensions, and solid compositions comprising the activie combination of one or more halocyanoacetamide and one or more halide salt are greatly preferred. Such solid compositions preferably comprise a mixture of from about 3, to about 20, to about 95, to about 99 parts by weight of the halide salt ingredient and about 1, to about 5, to about 80, to about 97 parts by weight of halocyanoacetamide ingredient, in intimate admixture with a surface-active dispersing agent. The solid concentrate composition generally will contain from about 5 to about 99 percent by weight of the active mixture. The surface active agent can include solid emulsifying agents such as finely divided bentonite, pyrophyllite, fuller's earth, attapulgite, silica, other clays and mineral carriers as well as liquid and solid ionic and non-ionic wetting and dispersing agents, alkaline earth metal caseinates, alkyl aryl sulfonates, sulfonated oils, complex organic ester derivatives, complex ether alcohols, sucrose tallowates, condensation products of alkylene oxides with phenols and organic acids, polyoxyethylene derivatives of sorbitan esters or sugar esters, mahogany soaps and the like. Other suitable surface active agents may be found in "Detergents and Emulsifiers, Up To Date," written and published by John W. McCutcheon, Inc., Morristown, New Jersey (1967). The solid compositions can be prepared as finely divided solids in the form of dusts or wettable powders, granules, pellets, dispersible or soluble tablets adapted to disperse the active mixture rapidly when added to water. They can also include other additaments such as deodorizers, perfumes, dyes or the like as may be desired.

The compositions wherein the halocyanoacetamide corresponds to the above formula wherein $X_1$ is bromine lose their antimicrobial activity within a few hours to a few days when dispersed in water at alkaline pH of from 8 to 14. The resulting aqueous compositions can then be discharged to the environment or to microbial waste water treatment facilities with relatively little detrimental effects. In addition to the halide and halocyanoacetamide ingredients, a preferred composition comprises sufficient of a solid water-soluble base such as an alkali metal hydroxide, carbonate, bicarbonate, phosphate or borate or a buffered salt mixture to provide a pH of at least about 8 when the composition is dissolved or dispersed in water to provide an antimicrobial amount of the mixture therein. The accelerated disinfectant action of the composition and method of the invention serve to provide rapid disinfectant action with a few seconds to one to two hours, while the presence of the water-soluble base provides removal of the disinfectant properties of the resulting disinfected aqueous composition. The exact amounts of the water soluble base and the disinfectant combination to be employed in such compositions depends on such factors as the pH of the aqueous preparation to be disinfected, the exact basic substance employed, the microbial population to be destroyed, and the time the resulting preparation is to be held before discharge. In general, the composition should include sufficient water-soluble base to provide a pH of from about 8 to about 10 in an aqueous preparation when dissolved therein at a rate sufficient to provide from about 50 to about 500 parts of the halocyanoacetamide per million parts of ultimate aqueous dispersion.

DESCRIPTION OF PREFERRED EMBODIMENTS

The following examples illustrate the method and composition of the invention.

EXAMPLE 1

The increased antimicrobial activity of the compositions of the invention is illustrated using a culture of *Staphylococcus aureus* in the logarithmic phase of growth. An aqueous culture medium is prepared as follows:

| Ingredient | Amount |
| --- | --- |
| Dipotassium phosphate | 2.3 grams |
| Casamino acids | 5.0 grams |
| Uracil | 5.0 milligrams |
| Yeast Extract | 1.0 gram |
| Salt solution* | 2.5 milliliters |
| Water | q.s. to 975 milliliters |

*The salt solution contains 4 grams magnesium sulfate heptahydrate, 0.2 grams ferrous sulfate heptohydrate and 0.15 gram manganous sulfate monohydrate in 100 milliliters of water. The pH of the above solution is adjusted to pH 7.2 – 7.4 and the solution is sterilized, then aseptically mixed with 25 milliliters of sterile aqueous 10 percent glucose solution.

One milliliter of an actively growing culture of *Staphylococcus aureus* in the above medium is used as an inoculum for 9.0 milliliters of sterile medium to which a test composition has been added. The inoculum contains about 1200 to 1800 million organisms per milliliter. Aliquots are withdrawn at timed intervals after inoculation for plating to obtain bacterial counts.

The organism counts obtained after 30, 60 and 120 minutes exposure to representation test compositions are set out in the following table:

Test Composition Ingredients

| Halocyanoacetamide* Concentration in Parts Per Million | | Halide Concentration in Parts Per Million | | Weight Ratio (Halocyanoacetamide: halide) | Bacteria Count After Time in Min. | | | |
| --- | --- | --- | --- | --- | --- | --- | --- | --- |
| | | | | | 0 | 30 | 60 | 120 |
| DBCA | 121 | | 0 | — | 110M** | 70M | 6000 | 0 |
| DBCA | 121 | | 0 | — | 170M | 100M | 13000 | 0 |
| MBCA | 184 | | 0 | — | 140M | 140M | 140M | 125M |
| DCCA | 7645 | | 0 | — | 170M | 130M | 140M | 60M |
| — | 0 | NaI | 75 | — | 105M | 165M | 155M | 220M |
| — | 0 | NaI | 1.50 | — | 110M | 125M | 130M | 170M |
| — | 0 | NaBr | 51.5 | — | 150M | 135M | 140M | 160M |
| DBCA | 121 | NaI | 3.75 | 32:1 | 100M | 20M | 0 | 0 |
| DBCA | 121 | NaI | 75 | 1.6:1 | — | 0 | 0 | 0 |
| MBCA | 184 | NaI | 15 | 12.3:1 | — | 35M | 3.75M | 3500 |
| MBCA | 184 | NaI | 150 | 1.2:1 | 135M | 140M | 0 | 0 |
| MBCA | 184 | NaI | 1500 | 0.12:1 | — | 0 | 0 | 0 |
| DCCA | 7645 | NaI | 750 | 10.2:1 | 160M | 125M | 0 | 0 |
| DCCA | 7645 | NaI | 7500 | 1.02:1 | 195M | 0.6M | 0 | 0 |
| DCCA | 7645 | NaI | 75000 | 0.102:1 | 190M | 0 | 0 | 0 |
| DBCA | 121 | NaBr | 5.2 | 23:1 | 120M | 45M | 350 | 0 |
| DBCA | 121 | NaBr | 51.5 | 2.3:1 | 125M | 15M | 100 | 0 |
| DBCA | 121 | NaBr | 515 | 0.23:1 | 165M | 15M | 150 | 0 |

*The specific halocyanoacetamides are identified by acronym, e.g. DBCA is dibromocyanoacetamide, MBCA is monobromocyanoacetamide, DCCA is dichlorocyanoacetamide.
**Bacteria count is expressed in number of organisms per milliliter, with the abbreviation "M" indicating millions, e.g., 110M indicates 110,000,000 organisms per milliliter.

The above results illustrate the substantial potentiation and acceleration of disinfectant action obtained with combinations comprising from about 0.05 to about 10 moles of halide ion per mole of halocyanoacetamide or from about 3 to about 91 weight percent of halide salt in the combination.

EXAMPLE 2

In an operation similar to that described above with respect to Example 1, various mixtures of sodium iodide and 2,2-dibromo-2-cyanoacetamide are employed against *Staphylococcus aureus* as a test organism. The mixtures are formulated in the culture medium by adding sufficient 2,2-dibromo-2-cyanoacetamide thereto to provide an ultimate concentration of 125 parts by weight of the antimicrobial agent per million parts by weight of ultimate dispersion, and adding varying amounts of sodium iodide to separate culture vessels to provide a series of different weight ratios of the two ingredients. The bacteria counts obtained after 5 minutes exposure of the organisms to the antimicrobial mixtures are set out below.

| Run No. | Weight Ratio of DBCA to No. 1 | Average Organism Count (Organisms per Milliliter) |
|---|---|---|
| 1 | 100/0 | $8\times10^6$ |
| 2 | 80/20 | $6.5\times10^6$ |
| 3 | 60/40 | $7\times10^5$ |
| 4 | 40/60 | $1.3\times10^3$ |
| 5 | 20/80 | 0–100 |
| 6 | 5/95 | 0–5 |
| 7 | 0/100* | $2.6\times10^7$ |

*Sodium iodide at a concentration of 125 parts per million. The average count observed at zero time is about $2.5\times10^7$ organisms per milliliter. The above results show the marked increase in rapid antimicrobial activity obtained by the use of the mixtures as compared to sodium iodide alone, which gave a slightly increased count, or 2,2-dibromo-2-cyanoacetamide alone.

EXAMPLE 3

The procedure of Example 2 is repeated employing 62.5 parts of 2,2-dibromo-2-cyanoacetamide per million parts of ultimate dispersion. The initial bacteria counts are about $6.3 \times 10^7$ organisms per milliliter. The counts obtained after exposure times of 5 and 35 minutes exposure are set out below:

TABLE 3

| Composition | Weight Ratio of DBCA/NaI | 5 Min. Elapsed Time | | 35 Min. Elapsed Time | |
|---|---|---|---|---|---|
| | | Count | % Count Reduction | Count | % Count Reduction |
| DBCA 62.5 ppm | 100/0 | $6.3\times10^7$ | 0 | $3.2\times10^7$ | 49 |
| Mixture | 80/20 | $4.5\times10^7$ | 29 | $5.9\times10^2$ | >99.9 |
| Mixture | 60/40 | $8.7\times10^6$ | 86 | 0–5 | >99.9* |
| Mixture | 40/60 | $2.0\times10^2$ | >99.9 | 0–5 | >99.9 |
| Mixture | 20/80 | 0–5 | >99.9 | 0–5 | >99.9 |
| Mixture | 5/95 | 0–5 | >99.9 | 0–5 | >99.9 |
| (NaI 62.5 ppm) | 0/100 | $6.4\times10^7$ | −2** | $6.8\times10^7$ | −8 |

*The expression > is employed to indicate a percentage count reduction greater than the number set out.
**A negative percent count reduction indicates increased count.

EXAMPLE 4

Operations similar to those described above in Examples 2 and 3 are carried out employing a gram negative test organism, *Aerobacter aerogenes*, and an exposure time of six minutes. The average counts observed in such operations with exposure to 2,2-dibromo-2-cyanoacetamide and sodium iodide at concentrations of 50 parts per million are 6.2 and 94 organisms per milliliter, respectively. After six minutes exposure to a medium containing 50 parts of 2,2-dibromo-2-cyanoacetamide and 12.5 parts of sodium iodide per million parts of medium, the average organism count is found to be between 200 and 350 organisms per milliliter. Culture vessels containing 50 parts of 2,2-dibromo-2-cyanoacetamide and amounts of sodium iodide sufficient to provide weight ratios of acetamide compound to halide compound of 60/40, 40/60, 20/80 and 5/95 are nearly sterile after six minutes, having counts of zero to five organisms per milliliter.

EXAMPLE 5

A series of powder detergent compositions are prepared containing 2,2-dibromo-2-cyanoacetamide and sodium bromide either alone or a combination containing 90 percent by weight of sodium bromide. The detergent compositions also contain a sodium linear alkylate sulfonate surface-active dispersing agent (Ultrawet K Soft), sodium carbonate as a builder and sodium tripolyphosphate as a sequestering agent and builder. The compositions are dispersed into water in an amount of 0.5 grams of each composition per 100 milliliters of ultimate dispersion to obtain a series of liquid compositions. 100 Milliliters of each composition is inoculated with one milliliter of an actively growing suspension of *Escherichia coli* and aliquots are withdrawn after 30 seconds exposure and bacteria count reduction during the 30 second exposure period is determined. In such operations, a composition containing 40 parts of sodium carbonate, 30 parts sodium tripolyphosphate, and 10 parts of the surface active dispersing agent, and 18 parts of sodium bromide is found to give results exactly comparable to those obtained with a check composition containing the first above named three ingredients in the above proportions but no sodium bromide. A composition containing 40 parts of sodium carbonate, 30 parts sodium tripolyphosphate, 10 parts of the surface-active dispersing agent, and 2 parts of the halocyanoacetamide is found to provide a count reduction of less than one log over the 30 second period. Three compositions (A, B and C) containing 2 parts of 2,2-dibromo-2-cyanoacetamide, 18 parts of sodium bromide in a mixture of 40 parts of sodium carbonate and (A) 10 parts of the surface-active agent; (B) 30 parts of sodium tripolyphosphate; or (C) 10 parts of the surface-active agent plus 30 parts of sodium tripolyphosphate are found to give count reductions of 2.34, 2.19 and 2.45 logs, respectively.

EXAMPLE 6

In operations similar to those described above in Example 5, a series of detergent compositions are prepared and dispersed in water. One hundred grams of each of the resulting dispersions is inoculated with 1 milliliter of a 24-hour culture of *Escherichia coli*. After a 30-second contact time, one milliliter of the inoculated mixture is removed and diluted in sterile, deionized water for determination of count reduction. In such operations a dispersion containing 0.2 percent by weight sodium carbonate, 0.05 percent sodium linear alkylate sulfonate (Ultrawet K Soft), 0.15 percent sodium tripolyphosphate, 0.09 percent of sodium bromide and 0.01 percent of 2,2-dibromo-2-cyanoacetamide is found to give a count reduction of greater than 99 percent or greater than 2.1 logs in the 30-second exposure period. A composition which contains the above ingredients in the same amounts in percent by weight except for the omission of the sodium bromide is found to provide a count reduction of about 95.9 percent or 1.39 logs. A composition containing the first four above-named ingredients in the above concentrations and a check composition containing only the sodium carbonate, the surfactant and the sodium tripolyphosphate are found to give substantially identical results, count reductions less than 82 percent or less than 0.75 logs, the two latter compositions providing colonies too numerous to count at the highest dilution made.

EXAMPLE 7

A series of solid, water-dispersible, disinfectant compositions are prepared as follows:

99 Parts by weight of anhydrous sodium iodide is intimately mixed with 1 part by weight of crystalline 2-bromo-2-chloro-2-cyanoacetamide, 45 parts of an ethoxylated alkylaryl sulfonate surfactant (Triton X-200), 30 parts of sodium tripolyphosphate and 200 parts of sodium carbonate to prepare a water-dispersible solid composition.

4 Parts by weight of 2,2-dibromo-2-cyano-N-methylacetamide, 32 parts of 2-chloro-2-cyanoacetamide, 8 parts of a sorbitan trioleate surfactant (Span 85), 40 parts of sodium carbonate and 86 parts of magnesium iodide are mixed together to prepare a water-dispersible powder.

10 Parts by weight of crystalline 2,2-dibromo-2-cyanoacetamide is mixed with 90 parts by weight of anhydrous ammonium bromide, and the resulting mixture is blended with 10 parts each of sodium bromide and sodium iodide.

2 Parts by weight of 2,2-dibromo-2-cyanoacetamide, 19 parts by weight of sodium iodide, 20 parts of potassium carbonate, 65 parts of borax and 4 parts of polysorbate 80 are blended together to obtain a water-dispersible composition having rapid disinfectant action with relatively low persistence when dispersed in water.

What is claimed is:

1. A method of enhancing the antibacterial efficacy of a halocyanoacetamide in an aqueous environment, said halocyanoacetamide corresponding to the formula

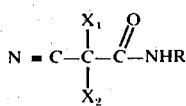

wherein $X_1$ represents chlorine or bromine; $X_2$ represents chlorine, bromine or hydrogen and R represents hydrogen or methyl which comprises adding thereto a source of halide ion selected from the group consisting of water-soluble alkali metal bromides, alkali metal iodides, alkaline earth metal bromides, alkaline earth metal iodides, ammonium bromide and ammonium iodide in an amount of from about 0.05 mole of said halide ion per mole of halocyanoacetamide up to about 99.999 percent by weight of halide ion.

2. The method of claim 1 wherein the halocyanoacetamide compound is 2,2-dibromo-2-cyanoacetamide.

3. The method of claim 1 wherein the source of halide ion is added in an amount of from about 0.1 mole to about 10 moles of halide ion per mole of halocyanoacetamide compound.

4. The method of claim 3 wherein the source of halide ion is a sodium halide and the halocyanoacetamide is 2,2-dibromo-2-cyanoacetamide.

5. A solid composition useful for the control of bacteria which comprises an effective amount of a mixture of a halocyanoacetamide compound corresponding to the formula

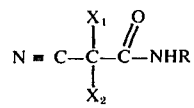

wherein $X_1$ represents chlorine or bromine; $X_2$ represents chlorine, bromine or hydrogen and R represents hydrogen or methyl, with a water-soluble halide salt selected from alkali metal bromides, alkali metal iodides, alkaline earth metal bromides, alkaline earth metal iodides, ammonium bromide and ammonium iodide, the halide salt being present in said mixture in an amount of from about 3 to about 99.999 percent by weight of said mixture.

6. The composition of claim 5 wherein the mixture contains the halide salt in an amount of from about 20 to about 97 percent by weight of the mixture.

7. The composition of claim 5 further comprising a surface-active dispersing agent in intimate admixture with the mixture of the halocyanoacetamide and the halide salt, and wherein the last said mixture comprises from about 5 to about 99 percent by weight of said composition.

8. The composition of claim 5 wherein the halocyanoacetamide is 2,2-dibromo-2-cyanoacetamide and the halide salt is a sodium halide.

9. A method useful for the control of bacteria comprising contacting bacteria in the presence of water with a bacterial-controlling amount of a mixture of a water-soluble halide selected from alkali metal, alkaline earth metal and ammonium bromides and iodides with a halocyanoacetamide compound corresponding to the formula

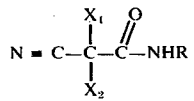

wherein $X_1$ represents chlorine or bromine; $X_2$ represents chlorine, bromine or hydrogen and R represents hydrogen, the halide being present in an amount of from 0.1 mole of halide ion per mole of halocyanoacetamide up to about 99.999 percent by weight of halide.

10. The method of claim 9 wherein the halocyanoacetamide is 2,2-dibromo-2-cyanoacetamide.

11. The method of claim 10 wherein the halide is sodium iodide and wherein the weight ratio of halocyanoacetamide to sodium iodide is from about 80/20 to about 5/95.

12. The method of claim 11 wherein the bacteria include *Staphylococcus aureus*.

* * * * *